United States Patent [19]

Arnold

[11] Patent Number: 4,478,439
[45] Date of Patent: Oct. 23, 1984

[54] REDUNDANT SEAL RING COUPLING ASSEMBLY

[75] Inventor: Jack A. Arnold, Littleton, Colo.

[73] Assignee: Stanley Aviation Corporation, Denver, Colo.

[21] Appl. No.: 362,288

[22] Filed: Mar. 26, 1982

[51] Int. Cl.³ ............................................. F16L 19/08
[52] U.S. Cl. .................................... 285/340; 285/351; 285/360; 285/DIG. 18
[58] Field of Search ............... 285/368, 412, 340, 414, 285/351, DIG. 18, 336

[56] References Cited

U.S. PATENT DOCUMENTS 3,625,552 12/1971 Muhoff .............................. 285/340

FOREIGN PATENT DOCUMENTS 746391 11/1966 Canada .............................. 285/340
1018227 1/1966 United Kingdom ............... 285/340

Primary Examiner—Dave W. Arola
Attorney, Agent, or Firm—LeBlanc, Nolan, Shur & Nies

[57] ABSTRACT

A fluid-conveying coupling assembly in which a plurality of torsionally deflectable seal rings establish a redundant seal between interconnected coupling structures and in which each seal ring is torsionally deflected to its seal-establishing condition by engagement with just one pair of formations on the coupling structure.

1 Claim, 3 Drawing Figures

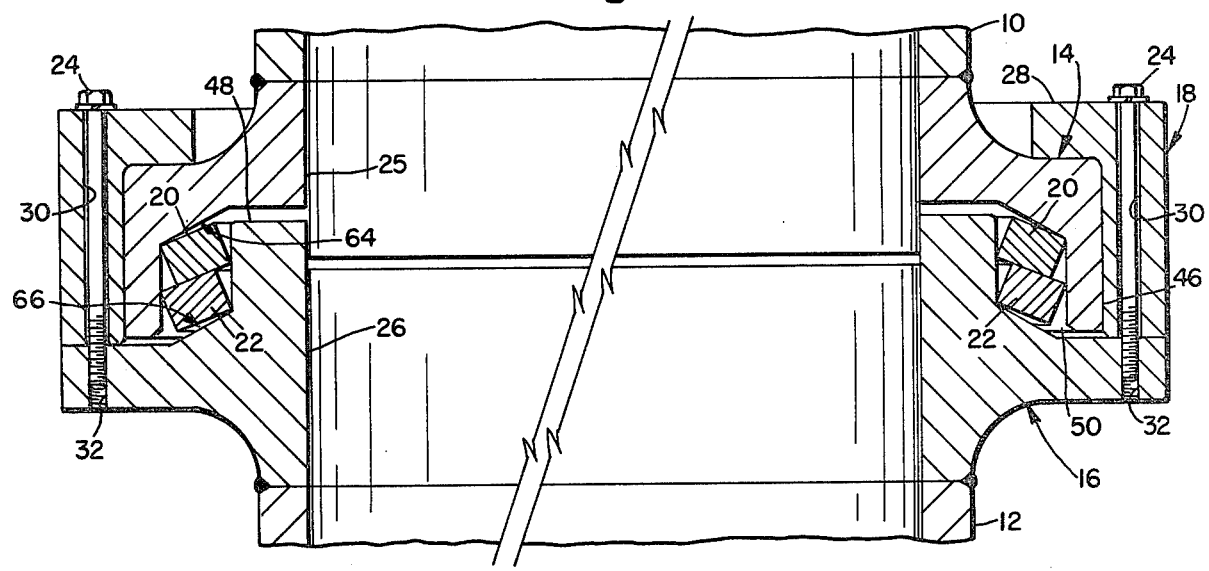
Fig. 1
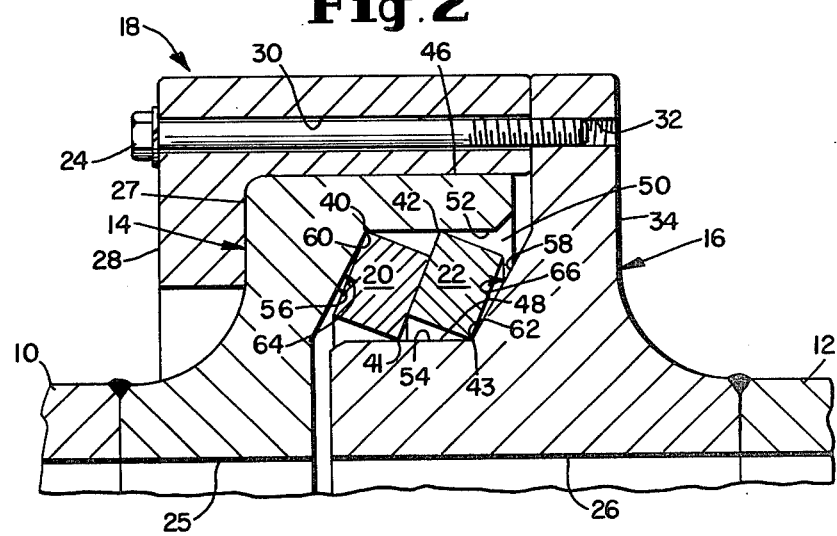
Fig. 2
Fig. 3

REDUNDANT SEAL RING COUPLING ASSEMBLY

FIELD OF INVENTION

This invention relates to fluid-conveying couplings and other fluid-receiving assemblies having a plurality of torsionally deflectable seal rings for establishing a redundant seal between the interconnected fluid-conveying parts. In particular, the present invention constitutes an improvement over the torsionally deflectable dual seal ring arrangement shown in FIG. 4 of U.S. Pat. No. 3,625,552 which issued to George A. Mahoff on Dec. 7, 1971.

BACKGROUND

The dual seal ring arrangement shown in FIG. 4 of the Mahoff patent advantageously provides a redundant seal whereby should one of the seal rings fail, the other will maintain a seal between the coupling parts.

In Mahoff's dual seal ring coupling, two pairs of seal ring-engaging formations are required, one for each seal ring, for torsionally deflecting the seal rings to their seal-establishing conditions as the coupling parts are axially drawn together. Each formation pair has one formation formed on the female coupling part and the other formation formed on the male coupling part. In practice, these formations are customarily machined on the coupling parts.

Aside from the extra expense involved in machining four seal ring-engaging formations on the coupling parts rather than just two, Mahoff's dual seal ring arrangement has two significant drawbacks.

First, the seal ring-engaging formations must accurately be located on the male and female coupling parts to ensure that both seal rings are torsionally deflected to the extent required for establishing a tight seal between the coupling parts. If one of the seal rings becomes fully deflected before the other is deflected to its seal-establishing condition, then only one seal ring will exert sufficient radial pressure for establishing a seal between the coupling parts.

Second, the seal rings used in the Mahoff arrangement are required to be of different diameters, thus giving rise to the inconvenience of stocking two different sizes of seal rings for the same coupling.

The present invention overcomes the foregoing drawbacks, but retains the advantage of the dual seal ring redundancy.

SUMMARY AND OBJECTS OF INVENTION

In the redundant seal ring arrangement of this invention, two or more interchangeable seal rings of equal size are torsionally deflected to their seal-establishing conditions by just two coupling formations.

In contrast to Mahoff's dual seal ring coupling, the dual seal ring coupling construction of the present invention is therefore less costly to manufacture, assures the positive establishment of seals between the coupling parts and eliminates the inconvenience of stocking differently sized seal rings for the same coupling.

With the foregoing in mind, the general aim and purpose of the present invention is to provide a novel redundant seal ring coupling which overcomes the previously described drawbacks of the Mahoff dual seal ring assembly.

Further objects of this invention will appear as the description proceeds in connection with the below-described drawings and the appended claims.

DESCRIPTION OF DRAWINGS

FIG. 1 is a longitudinal section of a fluid-conveying coupling assembly incorporating the principles of this invention and showing the seal rings in their deflected, seal-establishing conditions;

FIG. 2 is a fragmentary enlargement of the section shown in FIG. 1 to illustrate the dual seal ring arrangement in greater detail; and FIG. 3 sectioned fragmentary view similar to FIG. 2, but showing the coupling assembly in partially assembled form where the seal rings are still in their relaxed, undeflected conditions.

DESCRIPTION OF DRAWINGS

Referring to FIGS. 1 and 2 of the drawings, the coupling assembly is used to couple together a pair of tubular, fluid-conveying pipes or conduits 10 and 12 and mainly comprises a pair of axially aligned coupling members or flanges 14 and 16, a coupler ring 18, and a pair of torsionally deflectable seal rings 20 and 22. Flange 14 is welded or otherwise suitably fixed to pipe 10, and flange 16 is similarly welded or otherwise suitably fixed to pipe 12. Flanges 14 and 16 confront each other and are detachably coupled together by coupler ring 18 and a multiplicity of angularly spaced apart bolts 24.

In the illustrated embodiment, coupling flanges 14 and 16 are generally annular and are formed with uniformly diametered through passages 25 and 26, respectively, to establish fluid communication between pipes 10 and 12. It will be appreciated, however, that the coupling flanges, seal rings, and coupler ring may alternatively be rectangular or some other non-circular shape.

Coupler ring 18 coaxially and peripherally surround a radially extending portion 27 of flange 14 and is formed with a radially inwardly extending lip 28 which seats against the side of flange portion 27 facing axially away from flange 16. Bolts 24 extend through parallel smooth-walled bores 30 in ring 18 and are threaded into tapped bores 32 in a radially extending portion 34 of flange 16. Flange 14 is axially confined between the coupler ring's lip portion 28 and an opposing end face of flange 16. In place of bolts 24 any other suitable means may be used for drawing flanges 14 and 16 together.

Still referring to FIGS. 1 and 2, each of the seal rings 20 and 22 is of the same construction as that disclosed in the previously identified Mahoff U.S. Pat. No. 3,625,552. Seal ring 20 is thus formed with a rectangular cross section to define a pair of circumferentially extending, diagonally opposite corner edges 40 and 41, and seal ring 22 is likewise formed with a rectangular cross section to also define a pair of circumferentially extending, diagonally opposite corner edges 42 and 43. The disclosure of the Mahoff U.S. Pat. No. 3,625,552 is hereby incorporated into this specification by reference. As disclosed in the Mahoff patent, each of the torsionally deflectable seal rings is formed from a suitable metal which is resilient and preferably somewhat ductile. In the illustrated embodiment, seal rings 20 and 22 are of the same size, having equal inner diameters and equal outer diameters. The seal rings are interchangeable. When each seal ring is in its relaxed, undeflected condition, as shown in FIG. 3, its oppositely facing sides are flat and parallel.

Still referring to FIGS. 1 and 2, flange portion 27 terminates in an axially extending annular end portion 46 which coaxially surrounds the axially aligned, longitudinal axes of passages 25 and 26. Flange 16 is also formed with an axially extending annular end portion 48 which projects axially forwardly from the radial flange portion 34. End portions 46 and 48 are coaxial, are radially spaced apart from each other and axially overlap each other to define an annular, seal ring-receiving cavity 50. Cavity 50 lies between the two end portions and receives seal rings 20 and 22.

As shown, end portion 46 is formed with an inner cylindrical surface 52 which delimits cavity 50 along its outer periphery, and end portion 48 is formed with an outer cylindrical surface 54 which delimits cavity 50 along its inner periphery. Surfaces 52 and 54 face each other and are radially spaced apart. Being cylindrical, surfaces 52 and 54 are uniformly diametered.

Flange 14 is further formed with an inwardly facing conically contoured surface 56 at the juncture between the flange's end portion 46 and radial portion 27. Flange 16 is formed with an outwardly facing conically contoured surface 58 at the juncture between portions 34 and 48. Surfaces 56 and 58 confront each other, delimit cavity 50 and lie in conical envelopes having their apexes lying along the aligned longitudinal axes of passages 25 and 26. Surface 56 extends inwardly from surface 52, and surface 58 extends outwardly from surface 54.

The conical surface 56 is contiguous with and intersects the cylindrical surface 52 at an obtuse angle to form an inwardly opening circumferentially extending corner 60 for receiving the outer corner edge 40 of seal ring 20. Conical surface 58 is similarly contiguous with and intersects cylindrical surface 54 at an obtuse angle to form an outwardly opening circumferentially extending corner 62 for receiving the inner corner edge 43 of seal ring 22.

Surfaces 52 and 56 coact to define a first seal ring-engaging formation 64, and surfaces 54 and 58 coact to define a second seal ring-engaging formation 66. Formations 64 and 66 are the only seal ring-engaging formations required for torsionally deflecting seal rings 20 and 22 to their seal-establishing conditions.

For assembling the parts of the illustrated coupling assembly and for establishing fluid tight seals with seal rings 20 and 22, coupling ring 18 is positioned on flange 14 and rings 20 and 22 are positioned for reception between end portions 46 and 48. Coupling flanges 14 and 16 are then axially aligned at the positions shown in FIG. 3 where end portions 46 and 48 overlap each other and where seal rings 20 and 22 are positioned in side-by-side relation in cavity 50 and are in their relaxed, undeflected conditions. Before coupling flanges 14 and 16 are brought axially together to an extent where end portions 46 and 48 overlap each other, seal rings 20 and 22 may be supported on end portion 46 or end portion 48.

In their positions shown in FIG. 3, seal rings 20 and 22 lie radially between the opposing cylindrical surfaces 52 and 54 and axially between the confronting conical surfaces 56 and 58. The inner and outer diameters of seal rings 20 and 22 are such that when the seal rings are in their relaxed, undeflected conditions, there will be sufficient radial clearance between rings 20 and 22 and end portions 46 and 48 to enable the seal rings to be torsionally deflected to their seal-establishing conditions. Seal rings 20 and 22 therefore fit somewhat loosely in cavity 50 before they are deflected.

After the coupling parts are assembled in the positions shown in FIG. 3, bolts 24 are tightened to axially draw coupling flanges 14 and 16 further together, causing formations 64 and 66 to engage and axially urge seal rings 20 and 22 into abutment with each other. Upon axially urging seal rings 20 and 22 into abutment with each other, the continued axial displacement of coupling flanges 14 and 16 toward each other causes formations 64 and 66 to exert a force couple on the assembly of the seal rings to thus initiate the torsional deflection of the seal rings about their respective cross sections. One component of the force couple will be applied to corner edge 40 of seal ring 20 by formation 64 and will be transmitted through seal ring 20 to seal ring 22. The other component of the force couple will be applied to corner edge 43 of seal ring 22 by formation 66 and will be transmitted through seal ring 22 to seal ring 20.

The initial torsional deflection of seal rings 20 and 22 fully seats the seal ring corner edges 40 and 43 in corners 60 and 62, respectively. This initial deflection of seal rings 20 and 22 also seats the inner corner edge 41 of seal ring 20 generally radially against cylindrical surface 54 and seats the outer corner edge 42 of seal ring 22 generally radially against cylindrical surface 52. At this stage, coupling flanges 14 and 16 will therefore engage seal ring 20 just at its corner edges 40 and 41 and will similarly engage seal ring 22 just at its corner edges 42 and 43. Beyond this state, the continued axial displacement of coupling flanges 14 and 16 toward each other torsionally deflects both seal rings 20 and 22 to their seal-establishing conditions shown in FIG. 2. Axial displacement of coupling flanges 14 and 16 toward each other is limited by abutment of opposing end faces on flanges 14 and 16.

Upon being fully torsionally deflected in the manner shown in FIG. 2, each of the seal rings 20 and 22 will be deformed to a cone-shaped configuration in which the radial dimension of each seal ring is increased to cause the interference that produces the fluid tight seal between coupling flanges 14 and 16. It will be appreciated that the torsional deflection of seal rings 20 and 22 is brought about by the force couple mentioned above which effectively pivots or rotates the cross section of each seal ring about a center lying on its cross section. Seal ring 20 will therefore be radially, compressively loaded at its diagonally opposite corner edges 40 and 41, and seal ring 22 will likewise be radially, compressively loaded at its diagonally opposite corner edges 42 and 43.

When seal ring 20 is deflected to the condition shown in FIG. 2, it establishes two sealing interfaces, one being at the line of contact between the seal ring's corner edge 40 and corner 60, and the other being at the line of contact between the seal ring's corner edge 41 and cylindrical surface 54. When seal ring 22 is torsionally deflected to the condition shown in FIG. 2, it also establishes two sealing interfaces, one being at the line of contact between corner edge 42 and cylindrical surface 52, and the other being at the line of contact between corner edge 43 and corner 62.

In FIG. 2 it will be observed that only the corner edges 40 and 41 of seal ring 20 are engaged by formations 62 and 64. Similarly, only the corner edges 42 and 43 of seal ring 22 are engaged by formations 62 and 64. Depending upon the dimensions of the component parts in the coupling assembly, however, seal rings 20 and 22 may be torsionally deflected to a further extent where they respectively seat against the opposing conically contoured surfaces 56 and 58, but such additional torsional deflection of the seal rings is unnecessary for establishing the fluid-tight seals between coupling flanges 14 and 16.

It will be observed that the seals established by seal rings 20 and 22 are serially arranged along the fluid leak path which extends along the interface between coupling flanges 14 and 16. Seal ring 20 acts as the primary seal while seal ring 22 acts as a backup to provide the redundant sealing action in which seal ring 22 tends to block any leakage past seal ring 20 and operates as the primary seal if seal ring 20 fails.

Unlike the single seal ring embodiment shown in FIG. 1 of the Mahoff patent, one corner edge of each of the seal rings in the present invention engages and establishes a sealing interface with one of the cylindrical surfaces of the seal ring-engaging formations 64 and 66. Furthermore, seal ring 20 will be torsionally deflected, not by confining engagement with two coupling flange formations, but by engagement with just one coupling flange formation (namely, formation 64) and by engagement with seal ring 22, and seal ring 22 will likewise be torsionally deflected, not by confining engagement with two coupling flange formations, but by engagement of just one coupling flange formation (namely, formation 66) and by engagement with seal ring 22.

Formations 64 and 66 themselves differ from the seal ring engaging formation in FIGS. 1 and 4 of the Mahoff patent in that the cylindrical surfaces 52 and 54 are axially extended to accommodate two seal rings in the present invention. In particular, the axial length of cylindrical surface 54 is required to be sufficiently long to engage and establish a sealing interface with corner edge 41 of seal ring 20 when seal rings 20 and 22 are deflected to their seal establishing conditions. This requires cylindrical surface 54 to be substantially longer than the projected axial distance between the inner corner edges of seal ring 22 when both seal rings are torsionally deflected to their seal establishing conditions. Likewise, the axial length of cylindrical surface 52 is required to be sufficiently long to engage and establish a sealing interface with corner edge 42 of seal ring 22 and therefore must be substantially longer than the projected axial distance between the outer corner edges of seal ring 20 when the seal rings are in their torsionally deflected, seal-establishing conditions. Furthermore, one of the cylindrical surfaces 52, 54 is also required to be at least approximately as long as the sum of the axial lengths of seal rings 20 and 22 in their relaxed, undeflected conditions to support the seal rings before the coupling flanges 14 and 16 are axially drawn together to a sufficient extent to confine seal rings 20 and 22 between formations 64 and 66.

From the foregoing description, it will be appreciated that in contrast to the Mahoff dual seal ring arrangement, the redundant seal ring coupling assembly of this invention requires only two coupling flange formations for engaging and torsionally deflecting seal rings 20 and 22. Furthermore, seal rings 20 and 22 are of the same size and are interchangeable. As compared with the dual seal ring embodiment in FIG. 4 of the previously-identified Mahoff patent, the redundant seal ring coupling assembly of this invention is therefore less expensive and avoids the inconvenience of requiring the use of two non-interchangeable seal rings of different sizes as is the case in the Mahoff patent. Furthermore, more than two seal rings may be used, if desired, in the coupling of the present invention without requiring the addition of any more seal ring engaging formations.

Coupling flanges 14 and 16 may optionally be formed with unshown, radially overlapping annular shoulders similar to the ones designated at 14 and 15 in FIG. 1 of the previously identified Mahoff patent. If used, these shoulders coact to develop yet another seal in the manner described in the Mahoff patent.

Reference to the coupling flanges or other parts as being "tubular" is intended to cover both circular and non-circular (e.g., rectangular) configurations.

The invention may be embodied in other specific forms without departing from the spirit or essential characteristics thereof. The present embodiment is therefore to be considered in all respects as being indicated by the appended claims rather than by the foregoing description, and all changes which come within the meaning and range of equivalency of the claims are therefore intended to be embraced therein.

What is claimed and desired to be secured by Letters Patent is:

1. In a coupling assembly, first and second tubular fluid passage-defining structures, means for relatively drawing said structures axially together to assemble said structures in coupled relation to each other, a first formation forming a part of said first structure, a second formation forming a part of said second structure and cooperating with said first formation to define a cavity between said structures, said cavity extending circumferentially around the longitudinal axes of said structures and being disposed radially outwardly from the fluid flow passages through said structures, said first formation being formed with a first axially extending tubular end portion having a radially inwardly facing cylindrical surface delimiting said cavity, said second formation being formed with a second axially extending tubular end portion disposed radially inwardly of said first tubular end portion and having a radially outwardly facing cylindrical surface delimiting said cavity, said second tubular end portion being spaced from and unsupported by said first structure, said radially inwardly facing and radially outwardly facing cylindrical surfaces being radially spaced apart and axially overlapping each other when said structures are axially drawn together, said first formation being further formed with a circumferentially extending surface lying in a conical envelope and intersecting said radially inwardly facing cylindrical surface to define an inwardly opening circumferentially extending corner delimiting said cavity, said second formation being further formed with a circumferentially extending surface lying in a conical envelope and intersecting said radially outwardly facing cylindrical surface to define an outwardly opening circumferentially extending corner delimiting said cavity, said inwardly and outwardly opening corners being in diagonally opposed relation to each other, first and second interchangeable, equally sized torsionally deflectable seal rings received in said cavity, each of said seal rings having a pair of diagonally opposite corner edges and being torsionally deflectable about its cross section from a straightened configuration to a conical configuration in which it establishes a seal between said structures, said first and second formations engaging said seal rings to axially urge said seal rings into abutment with each other and to thereafter torsionally deflect each of said seal rings about its cross section to its conical configuration as said structures are axially drawn together to increase the radial dimension of each of said seal rings through its cross section for radially compressively loading each of said seal rings at its diagonally opposite corner edges and thereby establishing seals at the lines of contact between the diagonally opposite corner edges of each of said seal rings and said formations, said first seal ring having one of its diagonally opposite corner edges seated in said inwardly facing corner and the other of its diagonally opposite corner edges seating against said radially outwardly facing cylindrical surface in its torsionally deflected, seal-establishing condition, and said second seal ring having one of its diagonally opposite corner edges seated in said outwardly opening corner and the other of its corner edges seating against said radially inwardly facing cyindrical surface in its torsionally deflected, seal-establishing condition, the torsional deflection of said seal rings being initialized by engagement of only one of said corners with the assembly of said first and second seal rings, whereby only one of said corners is utilized to initialize torsional deflection of both of said seal rings, the deflected conical configuration of each of said seal rings lying along a conical envelope whose apex angle decreases as the seal ring is deflected from a relaxed condition to its torsionally deflected, seal-establishing condition, and stop abutment surface means limiting axial displacement of said first and second formations toward each other to limit the extent to which said seal rings are torsionally deflected by said first and second formations.

* * * * *